May 15, 1973 — N. J. GEORGES ET AL — 3,733,252

NUCLEAR FUEL ASSEMBLY

Filed Nov. 26, 1968

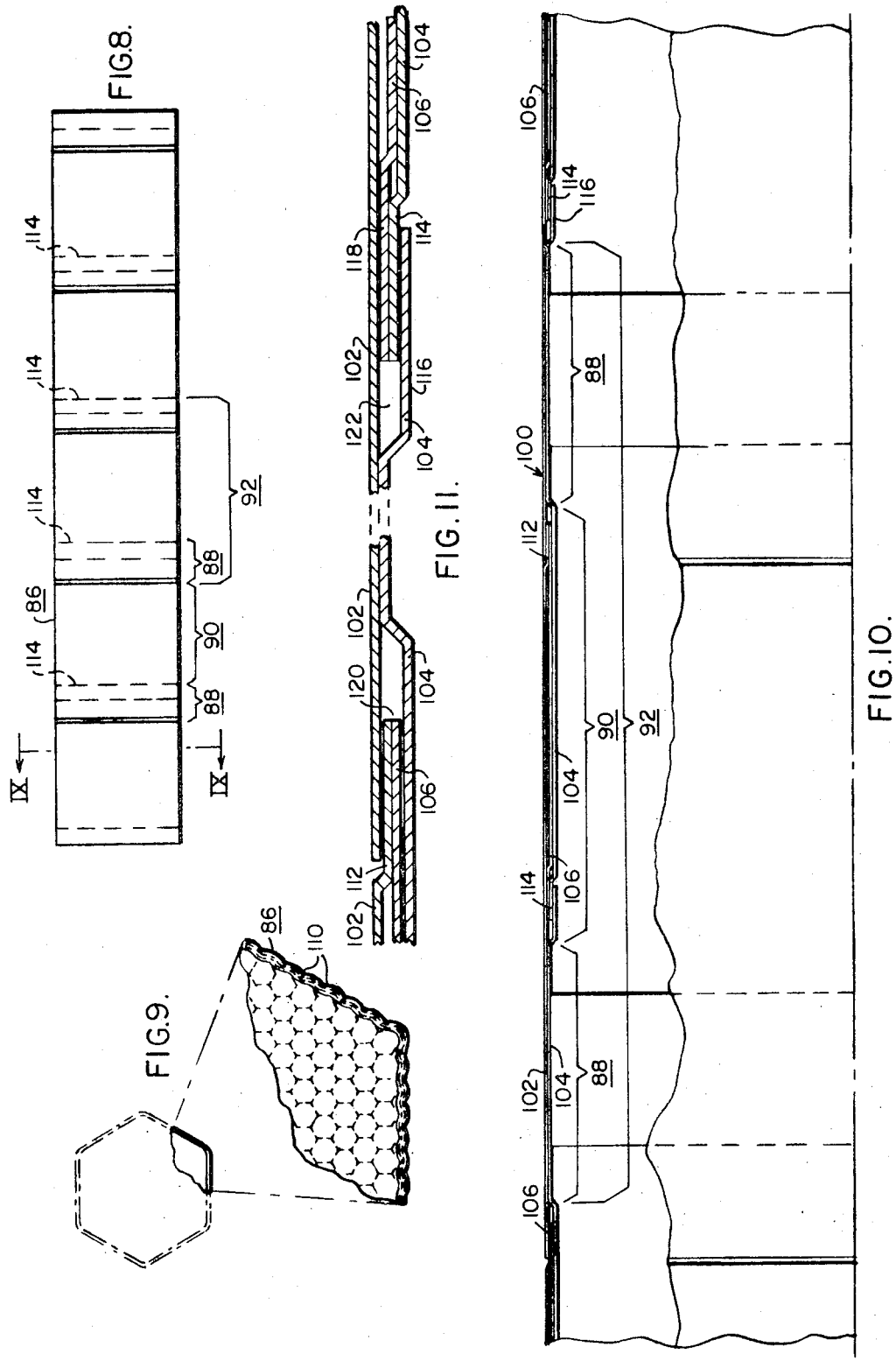

United States Patent Office 3,733,252
Patented May 15, 1973

3,733,252
NUCLEAR FUEL ASSEMBLY
Nicholas J. Georges, Pittsburgh, and William E. Pennell, Irwin, Pa., assignors to Westinghouse Electric Corporation, Pittsburgh, Pa.
Filed Nov. 26, 1968, Ser. No. 779,054
Int. Cl. G21c 3/34
U.S. Cl. 176—78
8 Claims

ABSTRACT OF THE DISCLOSURE

A fuel assembly for nuclear reactors wherein grid members having openings in which a plurality of fuel rods are laterally supported are structurally integrated by temperature compensated longitudinal members of an elongated framing means so as to minimize thermal bowing of the fuel rods. In one embodiment, the longitudinal members of the elongated framing means comprises a number of insulated tubes, each provided with an internal coolant flow channel and joined proximate their ends by the grid members. The grid members on each end are in turn joined by a shear resisting web structure to form a shear-grid such that a transverse temperature gradient produces end moments on the fuel assembly which balance each other. In another embodiment, the insulated tubes are replaced by struts constructed of several materials of selected lengths and thermal expansion properties so joined that the expansion of the various materials produces no overall elongation of the strut between selected points. In still another embodiment, the shear-grid structures are formed as and connected by a temperature compensated enclosure to form a "canned" fuel assembly having essentially zero expansion between a plurality of lateral planes at which the grids may be located. Optionally, groups of fuel rods may be joined by shear webs so as to produce an integral structure which may be inserted in the grid openings and thereby produce increased stability due to an increased moment of inertia.

BACKGROUND OF THE INVENTION

This invention relates to fuel assemblies for nuclear reactors, and more particularly to fuel assemblies so constructed as to minimize thermal bowing of the incorporated fuel bearing elements.

One general structural form commonly used for providing a nuclear fuel inventory in nuclear reactors is that in which numerous elongated cladding elements or rods containing fissionable material are arranged within a prescribed volume in a parallel array in an upstanding direction in the core of the nuclear reactor. To provide integrity in the support relationship, the fuel rods are divided into groups and the rods in each group are formed as a fuel assembly prior to placement in the reactor core. A fluid having coolant, and if desired neutron moderating properties, flows among and along the fuel rods.

A means must be provided for resisting lateral displacement of the fuel rods within the fuel assemblies. This means of late has taken the form of a plurality of spring finger type grids strategically placed along the fuel rods. The grids are normally tied together by a relatively rigid elongated framing or support structure such as a surrounding can, corner struts, or control rod guide thimbles.

While nuclear and hydraulic considerations dictate a minimization of the number of grids and a relatively light elongated framing structure, mechanical and thermal considerations dictate a close spacing of grids tied together by a relatively heavy support structure. A primary function of nuclear core designers is thus to satisfy the thermal and mechanical requirements without too greatly decreasing the nuclear and hydraulic characteristics of a core design.

Since heat generation rates in a nuclear reactor core are non-uniform and hence temperature gradients exist both longitudinally along and transversely across fuel rods, the fuel assembly must be so constrained as to resist thermal bowing. Thermal bowing of an unrestrained fuel rod produces a mode of deformation approximating a circular arc or, in other words, that mode of deformation which would be produced by a beam loaded by self-equilibrating end couples. Such a thermal bow must be prevented so as to minimize local neutron flux peaking, eliminate hot spots, and retain structural integrity of the assembly and the fuel cladding.

More particularly, an elongated framing means has been utilized to prevent thermal bowing of the fuel rods under transverse temperature gradients. Because the longitudinal members of the elongated framing means also have a tendency to elongate and bow under thermal gradients, the solutions of the prior art to the problem of thermal bowing generally took the form of a relatively heavy can or a plurality of relatively heavy tie rods or struts which are tied to each other laterally at numerous longitudinal locations. Relatively heavy framing members can result in the serious problem of stress relaxation due to the high level stresses induced by the temperature change across these structural members. In summary, the nuclear and hydraulic characteristics far from being maximized were sacrificed to the apparent necessities of thermal design.

Further, consideration of such mechanical problems as flow induced vibrations and cladding creep buckling dictate that the longitudinal members of a fuel assembly be laterally tied to each other at a relatively great number of longitudinal locations. Such a solution to the problem of lateral stability however decreases thermal heat transfer, causes a greater hydraulic pressure drop across the core, and decreases the number of neutrons available to produce power by efficient reaction.

SUMMARY OF THE INVENTION

A more efficient solution to the aforementioned problems of the prior art may be obtained by substantially fixedly supporting the fuel rods by a number of shear-grids structures (for purposes of this invention, a shear grid comprises two grids connected by a can or surrounding shear web), and connecting the shear-grids with temperature compensated longitudinal members of the elongated framing structure. The temperature compensated connecting elements minimally elongate and thus substantially prohibit the shear-grids from rotating. The fuel rods therefore cannot bow since more than minimal slope change will be prevented by the shear-grids.

In one embodiment, the longitudinal members of the elongated framing structure comprise several insulated tubes each provided with an internal coolant flow channel. In operation, the coolant proceeds from a lower coolant manifold through the coolant flow channels of the longitudinal member to an upper coolant manifold with only a minimal change in temperature. Moreover, the temperature of the fluid in the lower coolant manifold is relatively uniform and insulation may be provided surrounding the struts of this embodiment to assure that the average temperature across individually struts does not appreciably change. Thus the longitudinal members of the elongated framing structure of this embodiment have a minimal tendency to elongate because of the minimal temperature variations along and across the struts.

In another embodiment, the longitudinal members of the elongated framing means are constructed as a composite structure made up of an inner rod, an inner sleeve, and an outer sleeve. The inner rod and the outer sleeve are made of low expansion alloys while the inner sleeve is made of a high expansion alloy. The expansion of these various members in opposition to each other, in conjunction with proper selection of lengths, produces a generally zero expansion between preselected nodal points along these longitudinal members.

In still another embodiment a can which surrounds the fuel bundle is substituted for the above described struts. The can is also designed as a composite structure constructed of materials having different coefficients of thermal expansion which expand in opposition to one another so as to yield zero or essentially zero thermal expansion between a selected number of nodal points along the length of the fuel assemblies. The grids in this design may then be attached at these nodal points.

In either of the first two embodiments, wherein struts are utilized as the longitudinal members of the elongated framing structure, the grids on each end of the fuel assemblies are attached by perforated shear webs to form a shear-grid. The shear-grids are then affixed to the struts such that the grids are preferably equidistant at each side of the nodal points. The third embodiment is constructed and functions in essentially the same manner with temperature compensated can sections connecting shear-grid structures, which are also temperature compensated can sections. However, the nodal points are at the grid locations rather than between them.

DESCRIPTION OF THE DRAWINGS

For a better understanding of the invention reference may be had to the accompanying drawings, in which:

FIG. 8 is a schematic illustration of still another embodiment of the invention wherein a temperature compensated can is utilized as the longitudinal framing structure;

FIG. 9 is a sectional and expanded view taken along line IX—IX of FIG. 8;

FIG. 10 is an expanded view of a portion of the temperature compensated can of FIG. 8; and FIG. 11 is an expanded view of a section of the wall of the can portion of FIG. 10.

DESCRIPTION OF THE PREFERRED EMBODIMENTS

Figure 1:
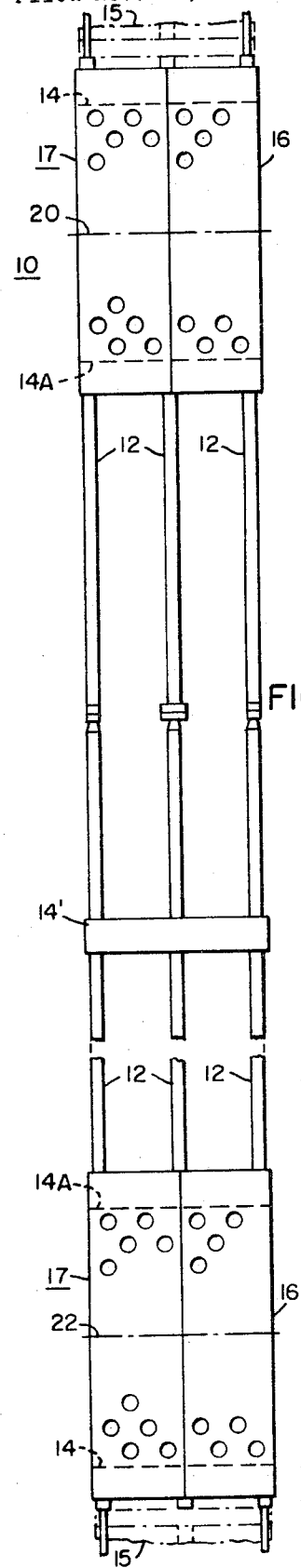
FIG. 1 shows a fuel assembly in accordance with this invention, the fuel rods and control rod guide sheath having been removed therefrom for purposes of clarity.
Figure 5:
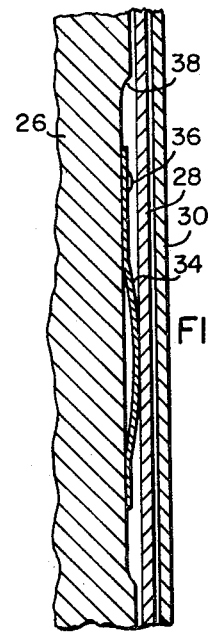
FIG. 5 is a view from a different orientation of the central rod alignment means of FIG. 2, and taken along line V—V of FIG. 2.

Referring now to FIG. 1, a fuel assembly is shown with the clad fuel rods and control rod guide sheath thereof removed for purposes of clarity. What remains, and is shown in FIG. 1, is thus an elongated framing structure of a fuel assembly; designated by the numeral 10. The elongated framing structure 10 includes longitudinal members or struts, three of which are shown, designated by the numeral 12, a plurality of grids 14, shear webs 16, and composite end structures 15 (shown in dotted lines). The grids 14 and the longitudinal members 12 of the elongated framing structure 10 are held together in a spacially fixed relationship by passing struts 12 through openings thereon and by welding or brazing the grids 14 to the struts 12 at a plurality of axially spaced locations. As will be explained, it is preferable that two grids 14 be affixed to the struts proximate each of their ends. As depicted in FIG. 1, additional or floating grids 14′ may be utilized, only one of which is shown. The grids 14′ may be included for additional structural stability where the length between the innermost outer grids 14A is sufficiently great. As will also be explained, it is also preferable that shear webs 16 be connected between the outermost grids 14 to form shear-grids 17. Shear webs 16 comprise thin metal enclosures and may contain a plurality of holes 18 to promote cross flow of coolant fliud.

In order to minimize and substantially eliminate thermal bowing in the fuel rods due to the transverse temperature gradient, which exists to varying degrees in all presently contemplated nuclear reactors, the elongated framing structure 10 must generate balancing constraint loads. A supporting structure, such as that shown in FIG. 1, is suitable for generating such constraint loads when the longitudinal members 12 of the elongated framing structure 10 are substantially prohibited from elongated due to thermal expansion.

The longitudinal members 12 of the elongated framing structure 10 are temperature compensated, as will be explained, such that their overall effective thermal expansion between lines 20 and 22 is zero. It may be noted that lines 20 and 22 lie midway between their respective sets of grids 14 and 14A. The struts 12 can restrain thermal bowing of the fuel rods through the grids 14 since balancing constraint loads, i.e., self-equilibrating bending moments, are generated between the shear grids 17. Also, as a consequence no shear loads are generated between the innermost grids 14A of the shear-grids 17. The shear forces generated between the outermost grids 14 are carried by the perforated shear webs 16.

From a less technical point of view, the shear-grid 17 may be viewed as a box-like structure which substantially rigidly hold the ends of the fuel rods. A transverse temperature gradient normally causes an elongated fuel rod to tend to bow and thus the shear-grid structures 17 to rotate in opposite directions. The shear-grids 17 are prohibited from doing so because they are tied together by a plurality of substantially constant length struts 12. The various above-indicated constraint loads are thus generated by the shear web 16 and the grids 14 and 14A in prohibiting the fuel rods from bowing. As a further consequence, the struts 12 see only tension or compression loads between the innermost grids 14.

Figure 3:
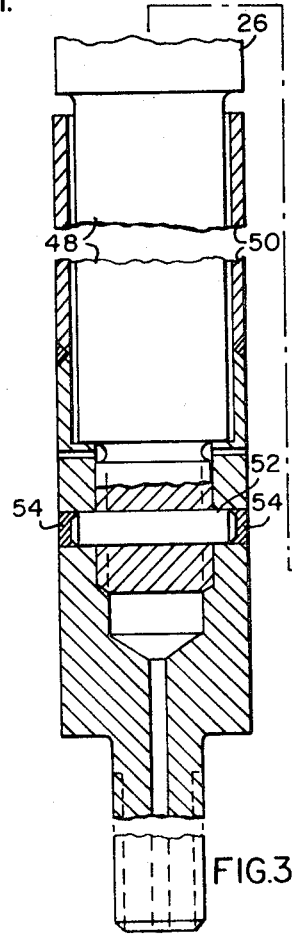
FIGS. 2 and 3 viewed together comprise a partially sectioned longitudinally view of a temperature compensated strut or longitudinal member of the elongated framing structure.
Figure 2:
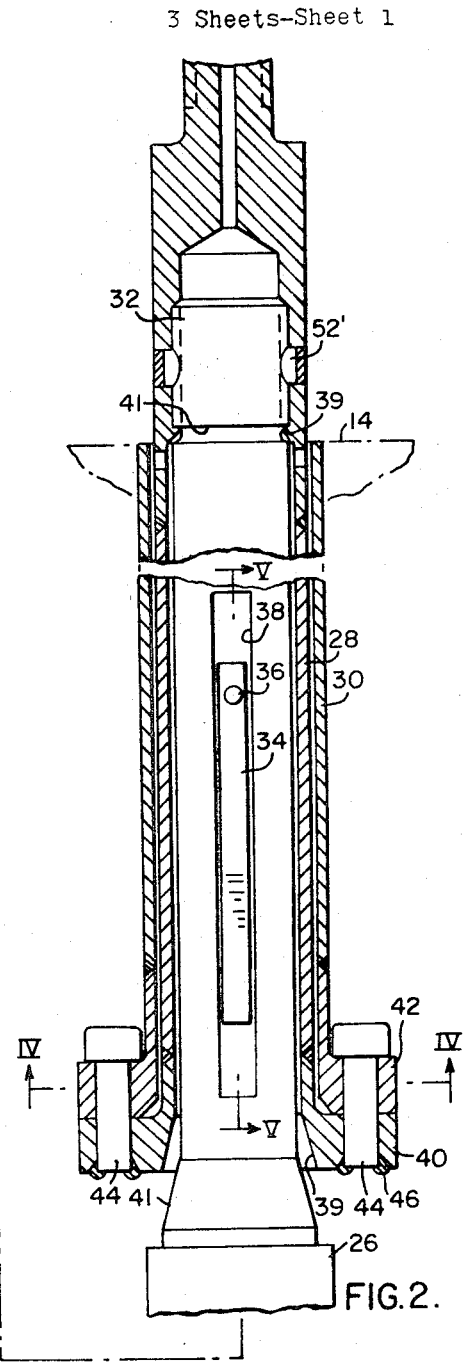
Figure 4:
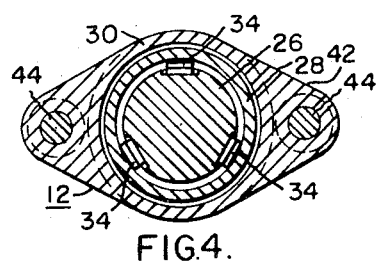
FIG. 4 is a cross sectional view taken along line IV—IV of FIG. 2.

Longitudinal members of the elongated framing structure struts 12 essentially comprise an inner rod 26, an inner sleeve 28 and an outer sleeve 30 which expands in opposition to each other and thereby provide temperature compensation, as may be seen most clearly in FIGS. 2 through 5. Referring to FIG. 2, it may be seen that the inner rod 26 has a reduced section 32 which is centrally received within and affixed to the inner sleeve 28. A plurality of leaf springs 34 are affixed to the inner reduced section of the inner rod 32 as by a rivet 36 or other suitable means within cutouts 38 provided for this purpose. The leaf springs 34 should be equidistantly spaced about the reduced section of the inner rod 32 as shown in FIG. 4 so as to maintain proper alignment of the inner rod 26 within the inner sleeve 28 before the struts 12 have reached operating temperature. When struts 12 have reached operating temperature a beveled portion 39 of inner sleeve 28 seats on a similarly beveled portion 41 of the inner rod 26 to yield greater lateral strength.

The inner sleeve 28 has an outwardly extending flange 40 which is fitted to a similar outwardly extending flange 42 on the outer sleeve 30. Bolts 44 may then be utilized to hold the flanges 40 and 42 tightly together, and the bolts 44 may be fixedly secured, as by welding at 46 for this purpose.

The outer sleeve 30 may then be affixed to grids 14, as shown by the dashed lines in FIG. 2, when fuel assembly 10 is constructed. The inner rod 26 and the outer sleeve 30 are made of a low expansion alloy such as a molybdenum base alloy while the inner sleeve 28 is made of a high expansion alloy such as type 304 stainless steel. The length of these various members are selected so as to produce zero expansion between preselected axially displaced nodal points such as generally designated as lying along lines 20 and 22 in FIG. 1.

The bottom of the inner rod 26 has further reduced section 48 which may be fitted centrally of and affixed to a sleeve 50 of a similar material such as type 304 stainless steel. One manner of affixing the reduced section of the inner rod 48 to the sleeve 50 is shown in FIG. 3 wherein a pin 52 is fitted through the inner rod 48 and extends partially through the sleeve 50 after the sleeve 50 has been threadedly affixed to inner rod section 48 and is welded thereto, as by welds 54. The inner sleeve 28 is similarly affixed to inner rod section 32 by a pan, as designated by the reference character 52'. Sleeve 50 is attached to grids 14 as may be seen in the composite structure of FIG. 1.

Figure 6:
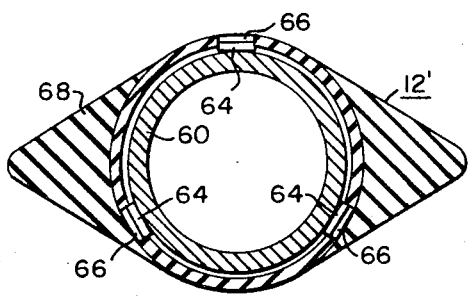
FIG. 6 is a sectional view of another embodiment of a temperature compensated strut or axial member of the elongated framing structure.

Referring now to FIG. 6, a strut 12' is shown in cross-section which approximates the temperature compensation properties of the strut 12 of FIGS. 2 through 5, and does so in a less complex manner. Strut 12' of FIG. 6 comprises a hollow central tube 60 affixed centrally within a mounting tube 62, formed from a suitable insulating material, by a plurality of spring fingers 64 and one or more rigid projections 66. Insulation, generally designated by the numeral 68, may be affixed to the exterior of the mounting tube 62. The combination of the insulation 60 and 68 and coolant flow within the central tube 60 provides a variation of the average temperature of the structural material considerably less than the temperature variation in the surrounding fluid. The thermal expansion and bowing of such a strut is thereby minimized.

Figure 7:
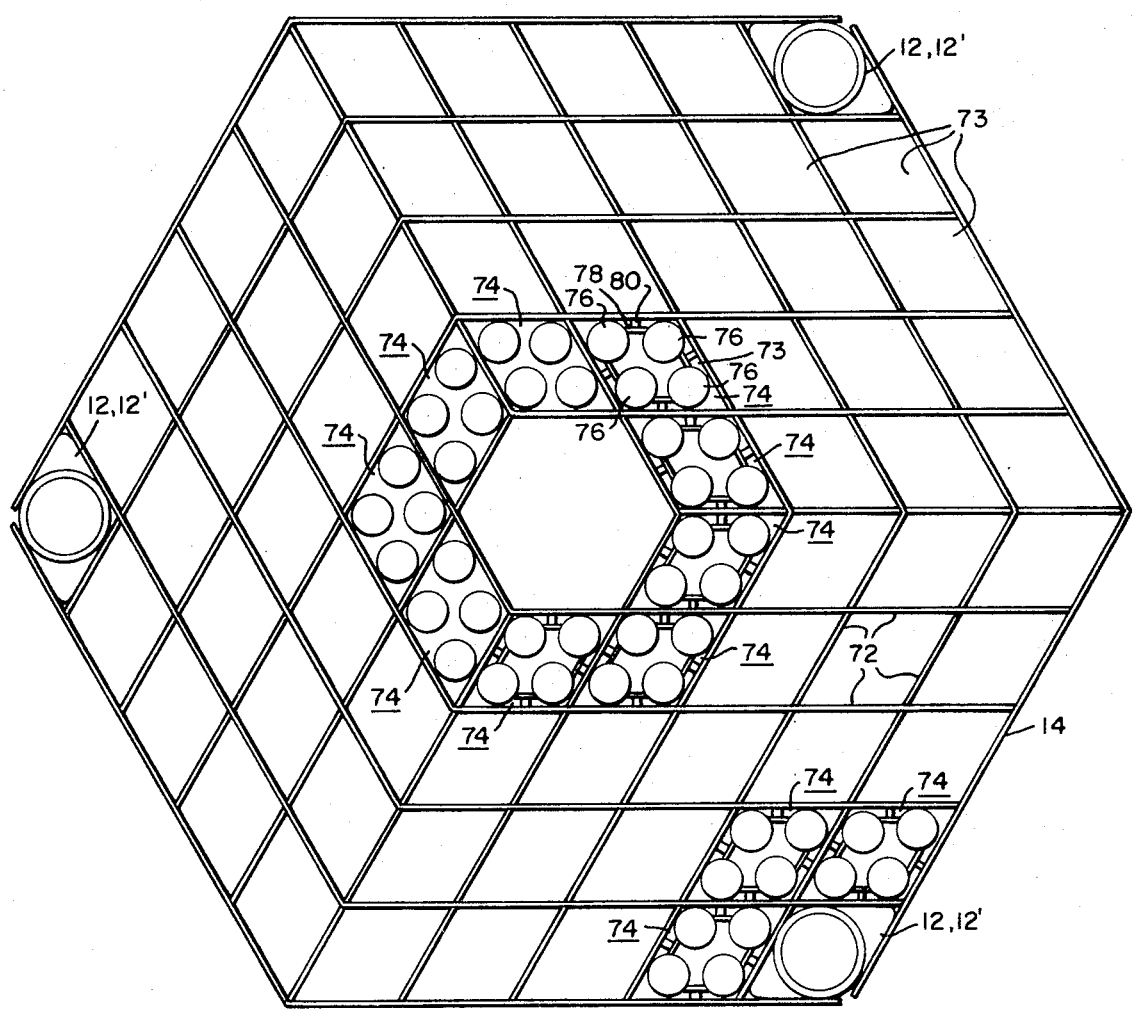
FIG. 7 is a plan view of a grid arrangement with clustered or grouped fuel rods

An example of a particular arrangement of struts 12' suitable for prohibiting rotation of the boxlike structures or shear-grids 17 is shown in FIG. 7. As illustrated therein, the grid 14 is welded to three struts 12' located adjacent the periphery of grid 14 at positions spaced 120° from each other.

Grid 14, which may be of any suitable design, comprises a plurality of grid straps 72 forming openings 73 therebetween. Each opening 73 includes a plurality of rigid projections and one or more springs which hold a clad fuel rod containing fissionable or fertile material, or a grouping of such fuel rods, in a relatively fixed manner. Such a grid is shown and described in greater detail in Pat. No. 3,379,617, issued to H. N. Andrews et al. on Apr. 23, 1968. The particular grid 14 shown in FIG. 7 has rhomboid shaped openings. Fuel rod groupings 74 are shown in the rhomboid shaped openings 73 by way of example. Such as grouping of fuel rods 76 may be of advantage in a fuel assembly such as that shown in FIG. 1 wherein as few as four grids 14 are utilized, and the central span of the fuel rods may be unsupported or may include a floating grid 14', if desired. A grouping of fuel rods, such as 74, has a higher moment of inertia, i.e., flexural rigidity, than a single fuel rod and consequently is much more resistant to flow induced vibrations.

Group 74, as examplified, consists of four fuel rods 76 held together by a plurality of longitudinally relatively short shear webs 78. As many shear webs 78 as might be necessary to form a relatively rigid bundle of the fuel rods 76 may be utilized and situated where desired. However, it is of advantage to place the shear webs 78 at grid locations. Utilizing this expedient, the holding means within the grid openings 73, such as rigid members and/or springs shown schematically and designated by the numeral 80, may impinge upon the shear webs as opposed to the fuel rods themselves; as is now conventional. This is of advantage where high temperatures within the reactor vessel make the cladding of the fuel rods susceptible to fretting.

An alternative to utilizing struts 12 as the longitudinal members of the elongated framing structure 10, a can 86 may be utilized. An example of a can 86 which may be utilized in such an arrangement is shown in FIGS. 8 and 11 and is rendered minimally thermally responsive in a manner analogous to that of the struts 12 of FIGS. 2–5. The can 86 may be viewed as made up of longitudinal interspersed sections; grid receiving sections 88 and connecting sections 90. Grids 14 are secured to the grid receiving sections 88 as by welding or brazing. Connecting sections 90 are temperature compensated, in a manner to be described.

Functionally, each connecting section 90 cooperatively prohibits the shear-grid structures 92, formed of a connecting section 90 and its adjacent grid receiving sections 88, on either side of it from rotating. Each connecting section 90 is also a part of a shear-grid structure 92 which is prohibited from rotating by the next adjacent connecting sections 90. The entire can 90 may thus be viewed as a cylinder formed from juxtaposed shear-grid structures 92—none of which can rotate. Fuel rods (not shown) which are fixedly positioned within openings on the grids 14 thus cannot bow.

Can 86 is constructed from a plurality of identical sub-cans 100 as shown in FIG. 10. Sub-cans 100 are constructed from an outer generally cylindrical member 102 and an inner generally cylindrical member 104; both of a low-expansion alloy such as a molybdenum based alloy. An intermediate generally cylindrical member 106 of a relatively high expansion material such as type 304 stainless steel connects the inner member 104 and the outer member 102 as by welding or brazing at the ends of member 106. The members 102, 104 and 106 are thus free to slide with respect to each other and their lengths are so chosen as to yield essentially zero elongation proximate the ends of the composite structure, i.e., at the grid locations.

As may be seen in FIG. 9, the generally cylindrical members 102, 104 and 106 of can 86 have corrugations 110 in their generally cylindrical surface. The corrugations 110 provide rigidity to resist lateral buckling and also "isolate" the longitudinal expansion along lateral sections. Vertical slits (not shown) may also be utilized to further isolate longitudinal expansion and prevent lateral bending.

Desirably, the outer member 102 has an inwardly directed offset portion 112 at its lower end. The inner member 104 has an outwardly directed offset 114 at its upper end and an inwardly directed indentation 116 at its lower end. The intermediate member 106 also has an outwardly directed offset 118 at its upper end to correspond with the offset 114 in the inner member 104. The sub-cans 100 may then be joined end to end and welded or brazed at the grid locations. At the lower end of any sub-can 100, an indentation 116 of that sub-can 100 and the outer member 102 of the adjacent sub-can 100 form a slip-joint 120 (see FIG. 11) which cooperates with offset 112 to encourage free thermal expansion. At the upper end of any sub-can 100, the offsets 114 and 118 fit into a similar slip-joint 122 (see FIG. 11) formed by its outer member 102 and the indentation 116 of the other adjacent sub-can 100.

It is to be noted that when the various sub-cans 100 are joined, there is minimal shear along the section of joiner, i.e., at the grid locations, because af minimal expansion of the members with respect to these sections. The composite structure, can 86, thus forms a relatively stable longitudinal member for an elongated framing structure 10 which can prevent bowing of the fuel elements during operation.

While there have been shown and described what are at present considered to be the preferred embodiments of the invention, modifications thereto will readily occur to those skilled in the art. It is not desired, therefore, that the invention be limited to the specific arrangements shown and described and it is rather intended to cover in the appended claims all such modifications as fall within the true spirit and scope of the invention.

We claim as our invention:

1. A fuel assembly for nuclear reactors, which comprises:
   a plurality of parallel fuel elements comprising elongated sheaths containing fissionable materials;
   at least four grids extending laterally of said fuel elements, at least two of said grids being proximate each end of said fuel elements, each of said grids having a lattice shaped configuration and forming a plurality of openings through which the fuel elements extend, said openings having resilient means extending therein fractionally engaging the fuel elements for laterally positioning same;
   an enclosure surrounding only the two grids proximate each end of the fuel elements, said enclosure being connected to each of said grids and defining a structurally relatively rigid shear-grid structure;
   an elongated structure connecting said shear-grids, and means coupled to said elongated structure for minimizing the elongation of same due to the heat generated within the nuclear reactor.

2. The fuel assembly of claim 1 wherein the elongated structure includes a plurality of struts and each strut includes said elongation minimizing means.

3. The fuel assembly of claim 2 wherein the means for minimizing the elongation of said struts includes at least two members of different thermal expansion properties connected to expand in opposition to each other.

4. The fuel assembly of claim 2 wherein each said strut comprises a tubular member having an axial coolant flow channel therethrough.

5. The fuel assembly of claim 4 wherein each said strut also includes insulation surrounding said tubular member.

6. The fuel assembly of claim 2 wherein at least two fuel elements are connected by at least one shear web to form a fuel element group, and each of said fuel element groups being situated respectively in one said openings in said grids.

7. A fuel assembly for nuclear reactors which comprises:
   a plurality of parallel fuel elements comprising elongated sheaths containing fissionable materials;
   a plurality of grids extending laterally of said elements, said grids being spaced from each other along the length of said elements, said grids having a lattice shaped configuration and forming a plurality of openings through which said fuel elements extend, said openings having resilient means extending therein for fractionally engaging said elements for laterally positioning same;
   an enclosure surrounding at least a substantial number of said plurality of grids and being connected to each grid of said number of grids, a portion of said enclosure thus connecting two adjacent grids, said portion of said enclosure defining a shear-web; and
   means for minimizing the elongation of each shear-web due to heating coupled to each said shear web as defined.

8. The fuel assembly of claim 7 wherein the elongation minimizing means includes at least two concentric members of different thermal expansion properties connected to expand in opposition to each other.

References Cited

UNITED STATES PATENTS

| | | | |
|---|---|---|---|
| 2,994,657 | 8/1961 | Petrick | 176—78 |
| 3,202,583 | 8/1965 | Salesse et al. | 176—83 |
| 3,365,372 | 1/1968 | Swanson et al. | 176—83 |
| 3,515,638 | 6/1970 | Mims | 176—28 |
| 3,527,669 | 9/1970 | Bettis | 176—49 |
| 3,018,239 | 1/1962 | Happell et al. | 176—49 |
| 3,105,807 | 10/1963 | Blake | 176—75 |
| 3,216,901 | 11/1965 | Teitel | 176—49 |
| 3,239,426 | 3/1966 | Waine et al. | 176—78 |
| 3,247,076 | 4/1966 | Tutte et al. | 176—66 |
| 3,340,154 | 9/1967 | Sinclair et al. | 176—87 |
| 3,403,076 | 9/1968 | Bettis | 176—49 |
| 3,475,273 | 10/1969 | Krawiec | 176—87 |
| 3,068,163 | 12/1962 | Currier et al. | 176—78 |
| 3,105,026 | 9/1963 | Dickson | 176—78 |
| 3,158,549 | 11/1964 | Fowler | 176—78 |
| 3,423,287 | 1/1969 | Anthony et al. | 176—76 |

FOREIGN PATENTS

| | | | |
|---|---|---|---|
| 1,339,615 | 9/1963 | France | 176—76 |

CARL D. QUARFORTH, Primary Examiner

G. S. SOLYST, Assistant Examiner

U.S. Cl. X.R.

176—76